(12) United States Patent
Dantas

(10) Patent No.: US 8,692,648 B2
(45) Date of Patent: Apr. 8, 2014

(54) SYSTEM FOR MONITORING AND/OR CONTROLLING EQUIPMENT IN A HAZARDOUS AREA

(75) Inventor: Roy J. Dantas, Toronto (CA)

(73) Assignee: Snap-on Tools of Canada, Ltd., Mississauga (CA)

( * ) Notice: Subject to any disclaimer, the term of this patent is extended or adjusted under 35 U.S.C. 154(b) by 627 days.

(21) Appl. No.: 12/938,057

(22) Filed: Nov. 2, 2010

(65) Prior Publication Data

US 2011/0102129 A1    May 5, 2011

Related U.S. Application Data

(60) Provisional application No. 61/257,247, filed on Nov. 2, 2009.

(51) Int. Cl.
  *G05B 23/02* (2006.01)
  *B66F 7/06* (2006.01)

(52) U.S. Cl.
  USPC ............................ 340/3.1; 340/3.3; 187/211

(58) Field of Classification Search
  USPC ............ 340/3.1, 3.22, 3.32, 3.31, 3.44, 3.62, 340/3.8, 3.9, 3.2, 3.21, 3.23, 3.24, 3.3, 3.42, 340/3.43; 187/210, 211, 213, 216
  See application file for complete search history.

(56) References Cited

U.S. PATENT DOCUMENTS

| | | | |
|---|---|---|---|
| 3,507,212 A | | 4/1970 | Matteson |
| 3,777,698 A | | 12/1973 | Hunter |
| 4,522,221 A | * | 6/1985 | Chivens et al. .......... 137/118.07 |
| 4,712,653 A | * | 12/1987 | Franklin et al. ............... 187/269 |
| 6,014,076 A | | 1/2000 | Luzzader |
| 6,854,715 B2 | * | 2/2005 | Hicks et al. ................... 254/122 |
| 7,486,495 B1 | | 2/2009 | Diederichs et al. |
| 2003/0049854 A1 | | 3/2003 | Rhodes |
| 2004/0026180 A1 | * | 2/2004 | Baker ........................... 187/285 |

FOREIGN PATENT DOCUMENTS

CA    2568986    3/2006

* cited by examiner

*Primary Examiner* — Jennifer Mehmood
*Assistant Examiner* — Yong Hang Jiang
(74) *Attorney, Agent, or Firm* — Bereskin & Parr LLP/S.E.N.C.R.L., s.r.l.

(57) ABSTRACT

A system for monitoring and/or controlling equipment in a hazardous area can include at least one sensor disposed within the hazardous area. Each sensor can be non-electrical and can be adapted to interact with the equipment and generate at least a first sensor output and second sensor output. The first sensor output can be indicative of a first equipment state and a second sensor output can be indicative of a second equipment state. The system can also include at least one converter disposed outside the hazardous area. Each converter can be in communication with at least one of the sensors. Each converter can be configured to receive the first and second sensor output and generate a converter output signal based on at least one of the first and second sensor outputs.

35 Claims, 12 Drawing Sheets

SYSTEM FOR MONITORING AND/OR CONTROLLING EQUIPMENT IN A HAZARDOUS AREA

This application claims the benefit of U.S. Provisional Application No. 61/257,247, filed Nov. 2, 2009, and the entire contents of which are hereby incorporated by reference.

FIELD

This specification relates to a system for monitoring and/or controlling equipment that is operating in a hazardous environment.

INTRODUCTION

When operating equipment in a hazardous area it can be desirable to monitor and/or control the equipment from a remote location, outside the hazardous area. Examples of such equipment can include automotive lifts operating in automotive garages and/or other areas that have been designated as hazardous areas by the National Electrical Code Classification.

One method of remotely monitoring an automotive lift operating in a hazardous location is to transmit signals from the automotive lift to a device, for example an operator's console, in a remote location outside the hazardous area. Traditional monitoring and/or control systems use intrinsically-safe electric sensors or other signal generators that are connected by intrinsically-safe cables to intrinsically-safe signal barriers functioning at the boundary or interface between the hazardous and non-hazardous areas. Systems having electrical components within the hazardous area that are not specialized, intrinsically-safe components may not be certified by the National Electrical Code Classification for use in hazardous areas.

Specialized, intrinsically-safe electrical components may be expensive (when compared to analogous, non-intrinsically-safe components) and can require specialized installation and maintenance procedures. The failure of an intrinsically-safe electronic component within the hazardous area may present a safety hazard.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

In particular, applicants' teachings provide a system for monitoring or controlling equipment in a hazardous area. The system comprising at least one sensor disposed within a hazardous area, each sensor being non-electrical and being adapted to interact with the equipment and generate at least a first non-electric sensor output and a second non-electric second sensor output, the first sensor output being indicative of a first equipment state and the second sensor output being indicative of a second equipment state, a non-electrical communication link extending from the at least one sensor across a boundary between the hazardous area and a non-hazardous area, the non-electric communication link to carry the sensor outputs from the at least one sensor, and at least one controller disposed in the non-hazardous area, the at least one controller coupled to the communication link and operable to generate a controller output signal based on the sensor outputs.

Moreover, the system can further include at least one converter communicably linking the at least one sensor and the controller, the at least one converter connected to the communication link to receive the sensor outputs and convert it to a form useable by the at least one controller.

The at least one converter can be part of the at least one controller and converts the sensor outputs within the controller. Further, the at least one converter can be disposed in the non-hazardous area between the at least one sensor and the at least one controller.

The at least one converter can convert the non-electric sensor outputs to electrical signals. Other types of signals are contemplated, however, and the converter could also convert the non-electric sensor outputs to other suitable signals, including, for example, but not limited to, wireless communications.

The controller can be adapted to control the state of equipment based on the converter output signal.

The sensor outputs can be optical signals. Further, the sensor outputs can be output fluid flows. Applicants' teachings are not to be limited to just these two examples, however.

The system can further comprise a fluid circuit configured to receive a working fluid, each sensor comprising at least one regulator in the circuit, the at least one regulator disposed within the hazardous area and being operatively connected to the equipment, each regulator configured to receive an incoming fluid flow, the first and second sensor outputs comprising, respectively, the first and second output fluid flows downstream of the at least one regulator. Moreover, each converter comprises a pressure switch in communication with the fluid circuit downstream from respective ones of the at least one regulators. Further each regulator comprises a valve, each valve configurable between open and closed configurations, the first output fluid flow being generated when the valve is in the open configuration, the second output fluid flow being generated when the valve is in the closed configuration.

Further, the system can comprise at least one trigger member mounted on the equipment, each trigger member corresponding to and adapted to engage at least one valve, each trigger member and corresponding valve connected to the equipment so that changing the equipment from the first equipment state to the second equipment state causes the trigger member to change the configuration of at least one corresponding valve. Each trigger member can comprise a cam and each valve comprises a complimentary cam follower configured to engage the at least one cam.

Further, applicants' teachings provide for a lift system for operation in a hazardous area. The lift system comprises a lift mechanism, the lift mechanism being movable between first and second positions, at least one sensor connected to the lift, the at least one sensor being non-electric and being configured to generate at least a first non-electric sensor output and second non-electric sensor output, the first sensor output being indicative of the lift mechanism being in the first position and the second sensor output being indicative of the lift mechanism being in the second position, and a controller disposed outside the hazardous area, the controller in communication with the at least one sensor, and the controller being adapted to control the movement of the equipment based on the sensor outputs.

The lift system can further include at least one converter communicably linking the at least one sensor and the controller, the at least one converter to receive the sensor outputs and convert it to a form useable by the at least one controller. The at least one converter can be part of the at least one controller and converts the sensor outputs within the controller. The at least one converter can be disposed in the non-hazardous area between the at least one sensor and the at least one controller. The at least one converter can convert the non-electric sensor outputs to electrical signals.

Moreover, the controller is adapted to control the state of equipment based on the converter output signal. The sensor outputs can include optical signals. Further, the sensor outputs can include output fluid flows.

The lift system can also include a fluid circuit configured to receive a working fluid, each sensor comprising at least one regulator in the circuit, the at least one regulator disposed within the hazardous area and being operatively connected to the lift, each regulator configured to receive an incoming fluid flow, the first and second sensor outputs comprising, respectively, the first and second output fluid flows downstream of the at least one regulator. Each converter can include a pressure switch in communication with the fluid circuit downstream from respective ones of the at least one regulators. Each regulator can include a valve, each valve configurable between open and closed configurations, the first output fluid flow being generated when the valve is in the open configuration, the second output fluid flow being generated when the valve is in the closed configuration.

Moreover, the lift system can further include at least one trigger member mounted on the lift, each trigger member corresponding to and adapted to engage at least one valve, each trigger member and corresponding valve connected to the lift so that changing the lift from the first position to the second position causes the trigger member to change the configuration of at least one corresponding valve. Each trigger member can include a cam and each valve comprises a complimentary cam follower configured to engage the at least one cam.

Further, the at least one sensor can include at least a first sensor and a second sensor, the first sensor interacting with the lift so that the first sensor is triggered when the lift mechanism is in the first position, the second sensor interacting with the lift so that the second sensor is triggered when the lift mechanism is in the second position.

Moreover, the lift mechanism comprises at least one scissor lift, each scissor lift can include a pivotally connected first and second scissor member, and a respective valve connected to each scissor lift, the valve being mounted on one of the first and second scissor members and the cam mounted on the other of the first and second scissor members.

Further, the lift can include first and second scissor lifts, the respective valves on each scissor lift being pneumatically linked to an equalization converter, the equalization converter being adapted to provide an equalization converter output signal to the controller, the controller being adapted to equalize the positions of the first and second scissor lifts in response to the equalization converter output signal.

Applicants' teachings also provide for a method of monitoring and/or controlling equipment in a hazardous area. The method comprises the steps of sensing an equipment state using at least one sensor within the hazardous area, the at least one sensor being non-electric and being adapted to interact with the equipment, generating at least a first non-electric sensor output and a second non-electric sensor output, the first sensor output being indicative of a first equipment state and a second sensor output being indicative of a second equipment state, transmitting to a controller the non-electric sensor outputs across a boundary between the hazardous area and a non-hazardous area, generating a controller output signal based on the sensor outputs, and monitoring and/or controlling the equipment based on the controller output signal.

The method can also include converting in the non-hazardous area the non-electric sensor outputs to at least one corresponding signal for use by the controller. The method can have the step of converting take place within the controller. Further, the method can have the step of converting take place in the non-hazardous area and separate from the controller.

The method can include at least one converter to convert the non-electric sensor outputs to electrical signals. The non-electric sensor outputs can include, for example, optical signals and output fluid flows.

Moreover, in accordance with the method the equipment state can be at least first and second positions in a lift mechanism. The lift mechanism can include at least one scissor lift. The lift mechanism can also include first and second scissor lifts, where the controller output signal is used to equalize the positions of the first and second scissor lifts.

DRAWINGS

For a better understanding of the applicant's teachings, reference will now be made, by way of example only, to the accompanying drawings which show at least one exemplary embodiment, and in which.

DESCRIPTION OF VARIOUS EMBODIMENTS

Various apparatuses or processes will be described below to provide an example of an embodiment of each claimed invention. No embodiment described below limits any claimed invention and any claimed invention may cover processes or apparatuses that are not described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
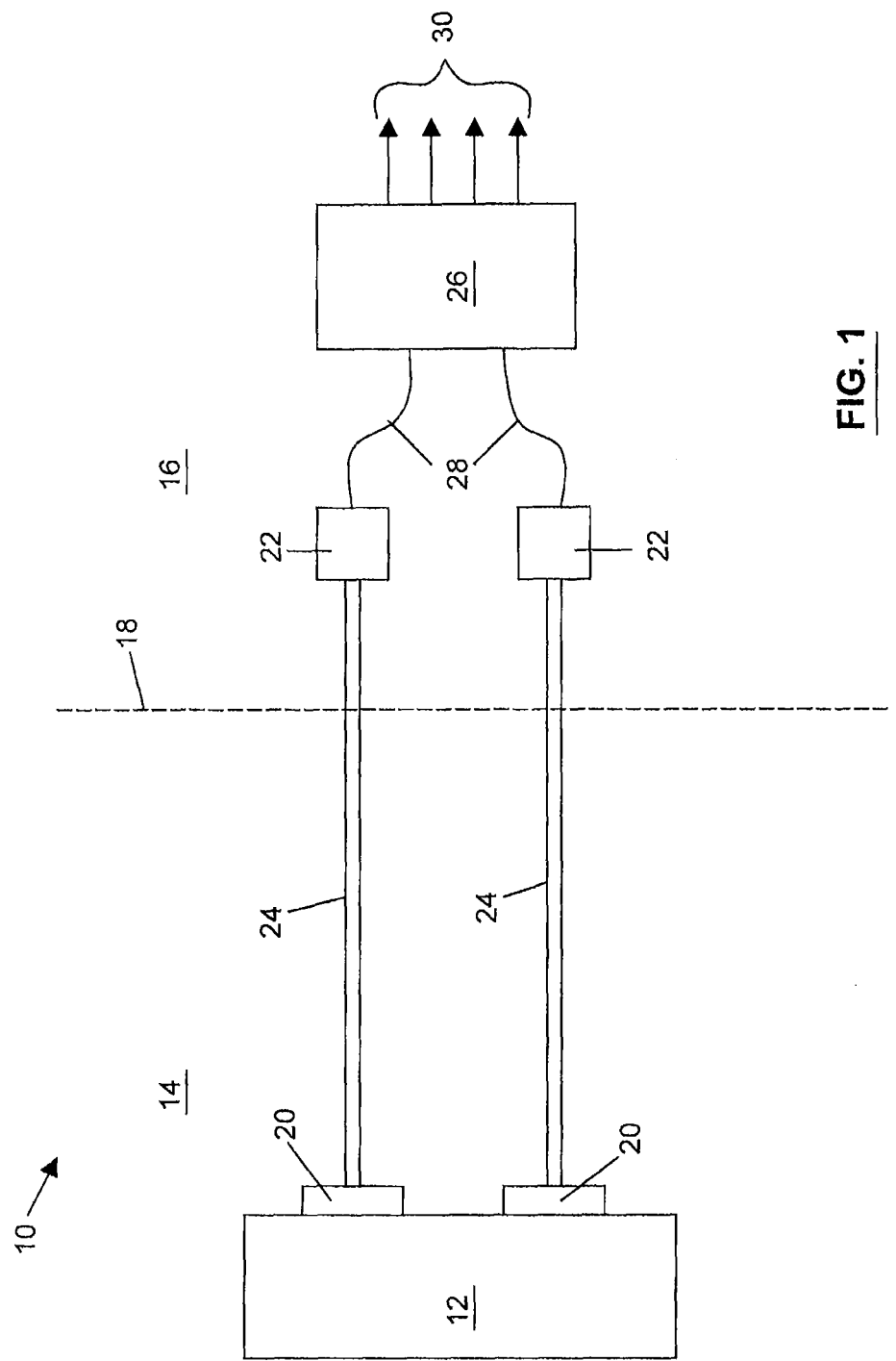
FIG. 1 is a block diagram of a system for monitoring and/or controlling equipment in a hazardous area.
Figure 2:
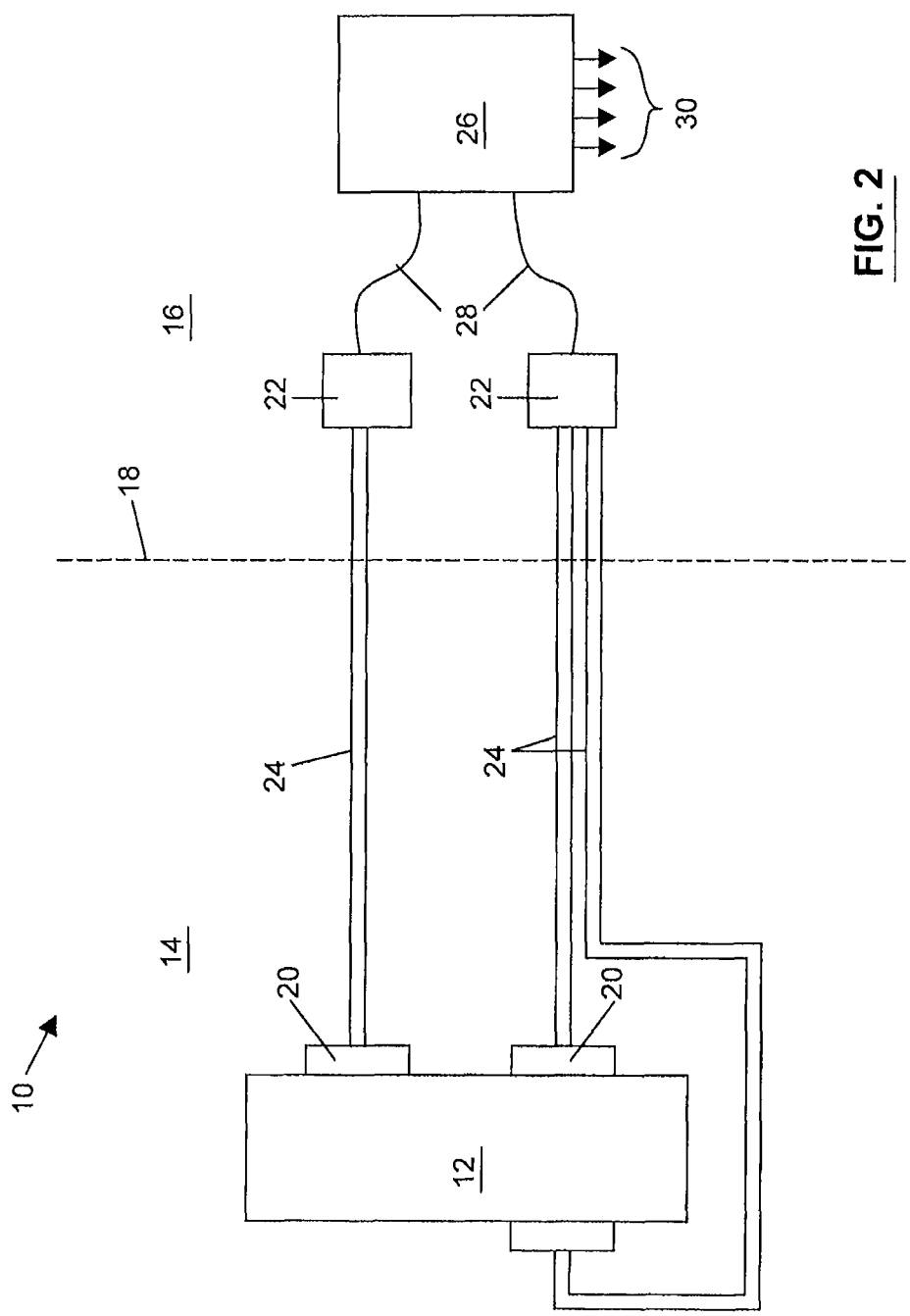
FIG. 2 is a block diagram of another example of a system for monitoring and/or controlling equipment in a hazardous area.

Referring to FIGS. 1 and 2, examples of a system 10 for monitoring and/or controlling equipment 12 operating in a hazardous area 14 and conveying the signals to a non-hazardous area 16 are illustrated using a schematic block diagram. In this description, the term hazardous area means any area that is classified as hazardous under the National Electric Code (NEC) classification system, and other analogous areas (for example areas classified as hazardous under similar statues or regulations in various regions and countries around the world).

Examples of hazardous areas can include, for example, but not limited to, automotive garage areas. The term non-hazardous, as used herein, means any area that has not been classified as hazardous under the NEC or other analogous regulation/statute. In the illustrated examples, the interface or boundary between the hazardous area 14 and the non-hazardous area 16 is represented as boundary line 18. In some examples the boundary 18 can be, or coincide with, a physical boundary separating the areas 14, 16, for example a wall or door. In other examples, the boundary 18 can be a non-physical boundary, for example a safe operating distance of at least 10 feet from a fuel source or combustion risk.

One example of equipment 12 that can be operated in a hazardous environment and monitored using the system 10 is lifting equipment or lift systems. Examples of lift systems include, for example, materials handling lifts and motor vehicle lift systems operated in automotive garages. If the equipment 12 is a motor vehicle lift system, the hazardous 14 area can be the interior of the garage service bay and the like, and the non-hazardous area 16 can be an office space or operator space that is separated from the service bay.

The system 10 includes one or more sensors or transducers 20 located within the hazardous area 14. The sensors 20 positioned within the hazardous area 14 are non-electrical, which may reduce the risk of electrical arcing, short circuits or other potentially dangerous occurrences within the hazardous area. Providing non-electrical sensors 20 in the hazardous area 14 may also increase the likelihood that the system 10 can be certified or approved under the NEC. The sensors 20 can be any type of suitable, non-electric sensor or transducer, including, for example, regulators, optical sensors, digital and analogue encoders, magnetic sensors and any combination thereof. As used herein, the term regulator is used to generally describe and any type of flow modifying apparatus that can be used in a pneumatic or hydraulic circuit or system, including, for example limit switches, valves, flow control valves, pressure regulating valves, pressure transducers, pneumatic and hydraulic encoders and flow rate monitors.

The sensors 20 are connected to the equipment 12 being monitored and/or controlled such that the sensors 20 can obtain desired information about the operation or performance of the equipment 12. For example, limit switches or proximity sensors can be used to monitor the position or movements of the equipment. In some examples all of the sensors 20 can be the same. In other examples, a variety of different sensor 20 types can be used within a single system 10 (for example the equipment 12 can be monitored using a combination of limit switches and optical sensors). It is understood the nature of the connection between the sensors 20 and the equipment 12 can be selected based on the particular configuration of the equipment 12 being monitored and/or controlled and the sensors 20 used. In some examples the equipment 12 includes one or more trigger members that are adapted to engage the sensors 20 used in the system 10. The trigger member can be any member that is suitable for engaging or triggering the particular sensor 20 selected. Examples of trigger members include, cams (described below with reference to FIGS. 6-9), magnets, equipment output shafts, structural portions of the equipment (for example a scissor member 84, 86 described below, or other portion of a lift system), reflective elements (when used in optical sensing systems) and the like.

The system 10 can also include one or more converters 22 located in the non-hazardous area 16 (i.e., anywhere outside the hazardous area 14). Each converter 22 is connected to one or more sensor 20 using a non-electrical communication link 24. The communication link 24 can be any type of connection that is suitable based on the nature of the sensor 20 and converter 22 selected in a particular system. For example, if the sensors 20 are pneumatic limit switches, the communication link 24 can be a pneumatic hose, pipe or other fluid conduit. In pneumatic or hydraulic systems the communication link 24 can comprise a fluid circuit configured to receive and circulate the system working fluid (such as, for example, air, oil, non-air gases and water). Alternatively, if the sensors 20 are optical sensors, the communication link 24 can be optical, for example, fiber optic strands.

In use, each sensor 20 can generate or produce at least first and second sensor outputs that are indicative of at least first and second equipment 12 operating conditions. In a pneumatic system, the first sensor output can be a first flow condition, such as a continuous air flow or an "on" condition and the second sensor output can be a second flow condition, such as the absence of airflow or an "off" condition. Such outputs can be described as digital outputs, having discrete "on" and "off" conditions. In other examples, the sensor 20 can be capable of generating more than two discrete sensor outputs. For example, a pneumatic system can include a variable valve or regulator that is operable to provide a plurality of flow rates. In such a system, the first sensor output or first flow condition can be a first flow rate, and the second sensor output or second flow condition can be a second flow rate. Such a system can also be operable to provide a third sensor output or third flow condition that is a third flow rate (different than both the first and second flow rates). A sensor 20 capable of providing a plurality of sensor outputs can be described as an analogue sensor (i.e., a device having an output that is proportional to its input). Optionally, the system 10 can include any desired combination of digital and analogue sensors.

Each converter 22 is adapted to receive the sensor outputs from at least one sensor 20 in the system 10 and to convert the sensor output into a converter output signal. Optionally, the converter 22 can include electrical components and the converter output signal can be an electrical signal. In other examples, the converter output signal can be non-electrical, such as a pneumatic air stream used to operate a non-electrical controller, such as, for example, a pneumatic logic controller. For example, if the sensors 20 are pneumatic limit switches and the communication links 24 are pneumatic fluid conduits then the converters 22 can be switch valves that are operable to convert pneumatic signals into electrical output signals. In other examples, the converters 22 can be any suitable apparatus that can convert the non-electrical sensor output signals into the desired converter output signal format. Typically, this would be an electrical signal, however, other types of signals are not to be excluded. For example, but not limited to, the converter could transmit its output signal wirelessly.

Optionally, as illustrated in FIG. 1, each converter 22 can be communicably linked to a single corresponding sensor 20. In such examples the converter output signal of each converter 22 can be based on the sensor output of a single sensor 20. In other examples, as illustrated in FIG. 2, a converter 22 can be adapted to be communicably linked to two (or more) sensors 20. In such examples, the converter output signal of a converter 22 connected to two or more sensors 20 can be based on the sensor output of either sensor 20, or any suitable combination of the sensor outputs.

The converters 22 can be communicably connected to any suitable equipment in the non-hazardous area 16, such as controller 26, using second communication links 28. The second communication links 28 can be any suitable type of connecting member capable of transmitting the converter outlet signals. Because the second communication links 28 are located in the non-hazardous area 16 they can be electrical wires or cables. However, second communication links need not be physical links, but could also be a form of wireless communication to the controller.

The optional controller 26 can be any suitable type of controller, including, for example, but not limited to, a computer and a programmable logic controllers or pneumatic logic controller (PLC), and can include any combination of suitable and appropriate components for receiving and processing the converter output signal, including, for example a microprocessor, a memory storing code executable by the processor, user interface controls and display apparatus. In some examples the controller 26 can be adapted to provide a plurality of controller outputs 30 which can be used, for example, to send controller output signals that can be used for a variety of purposes, including, for example, to control the equipment 12, provide display information on a monitor, provide user feedback or for any other suitable purpose.

Figure 3:
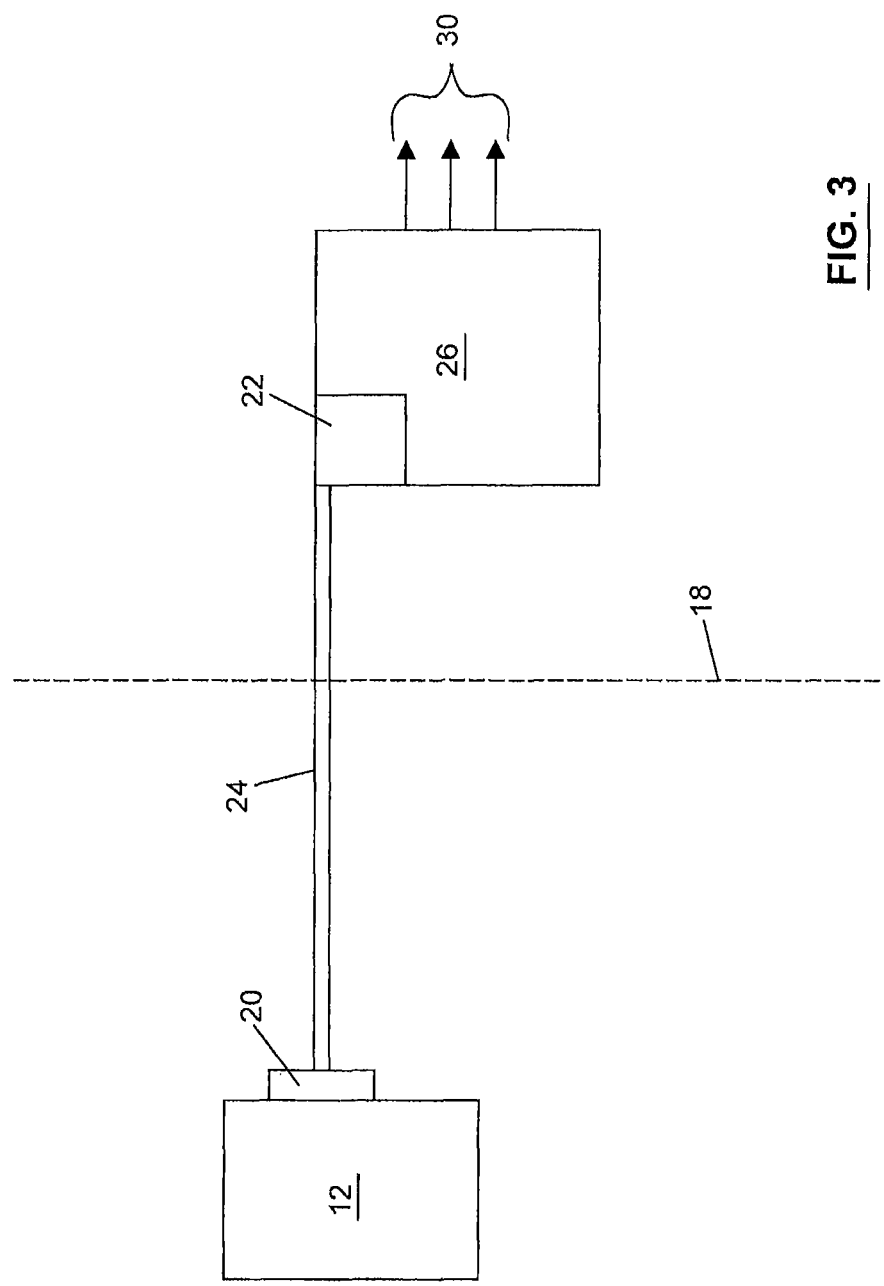
FIG. 3 is a block diagram of another example of a system for monitoring and/or controlling equipment in a hazardous area.

Optionally, as illustrated in FIG. 3, the converter(s) 22 can be physically incorporated or integrated into controller 26. In this configuration, the non-electric communication link 24 extends from the sensor 20 to the controller 26. The controller 26 can include an input that is suitable for connecting to, and receiving sensor outputs from the communication link 24, including, for example, but not limited to, optical connections. The converter 22 that is integrated into the controller 26 can then convert the non-electric sensor outputs into a converter output signal that is in a format that can be accepted and processed by the controller 26. Although, for simplicity, FIG. 3 shows one sensor 20 and one converter 22 within controller 26, it can be appreciated that more than one sensor and converter can be provided, similar to the examples shown in FIGS. 1 and 2. In fact, applicants' teachings can contemplate many arrangements and combinations of sensors and converters from FIGS. 1, 2 and 3, as well as others that will be evident to those skilled in the art.

Figure 4:
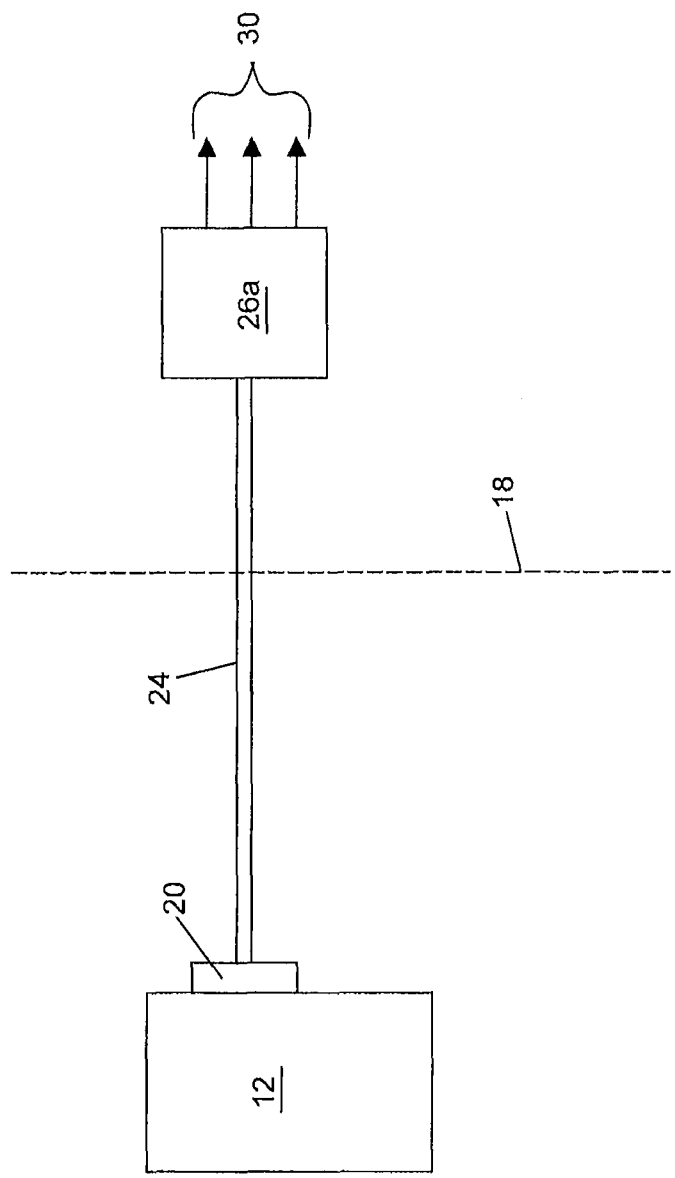
FIG. 4 is a block diagram of another example of a system for monitoring and/or controlling equipment in a hazardous area.

Referring to FIG. 4, another example of the control system 10 can include a non-electric controller 26a, such as, for example, but not limited to, a pneumatic PLC. In this configuration, the controller 26a is operable to receive the non-electric sensor output signals directly, and the control system 10 need not include a converter 22 element. In this example, the controller output signals 30 can be in the same format (i.e., pneumatic, optical, etc.) as the sensor output signals. Again, although, for simplicity, FIG. 4 shows one sensor 20, it can be appreciated that more than one sensor can be provided, similar to the examples shown in FIGS. 1 and 2. In fact, applicants' teachings can contemplate many arrangements and combinations of sensors, converters and controllers from FIGS. 1, 2, 3 and 4 as well as others that will be evident to those skilled in the art.

Alternate examples of a monitoring and control system described herein can be similar to system 10, and like components are represented using like reference characters indexed by one hundred (i.e., systems 110, 210, etc.).

Figure 5:
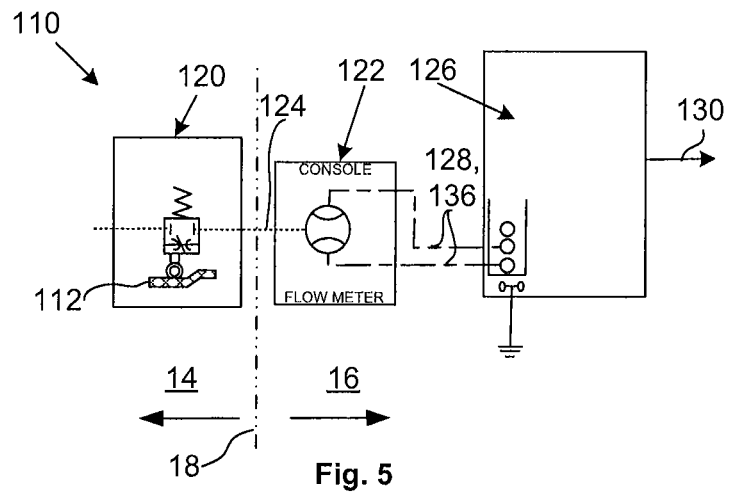
FIG. 5 is a schematic representation of another example of a system for monitoring and/or controlling equipment in a hazardous area.

Referring to FIG. 5, monitoring and/or control system 110 includes a sensor 120 that is connected to a converter 122 by a non-electrical communication link 124. The converter 122 is also connected to a controller 126 by a second communication link 128. Based on the converter output signals the controller 126 is configured to generate a controller output 130.

In this example, the system 110 comprises a pneumatic fluid circuit and the sensor 120 is a variably adjustable (i.e., analogue) flow control valve that is activated by a mechanical process in the hazardous area. Pneumatic fluid can be supplied to the pneumatic fluid circuit using any suitable fluid source, including, for example, a compressor, a pump, a storage tank and an accumulator (not shown).

In this example, the mechanical process measured by the sensor 120 is the interaction between a cam (i.e., trigger member) on the equipment 112 that acts on a roller, or other such feature, associated with the flow control valve as the equipment 112 moves. Based on the position of the flow control valve, variable fluid flow is sent along the non-electric communication link 124, which in this example is a pneumatic conduit or hose, across the boundary 18, to the converter 122 in the non-hazardous area.

In this example the converter 122 is a console flow meter that is configured to measure the flow rate of the pneumatic fluid and to convert the fluid flow rate into a representative or proportional electrical signal (i.e., the converter output signal). The electric converter output signals are carried by wires, acting as second communication links 128, to the controller 126. Based on the converter output signals, the controller 126 generates one or more controller outputs 130. It can be appreciated, however, that in applicant's teachings, converter 122 can be incorporated into controller 126, similar to the example shown in FIG. 4.

Figure 6:
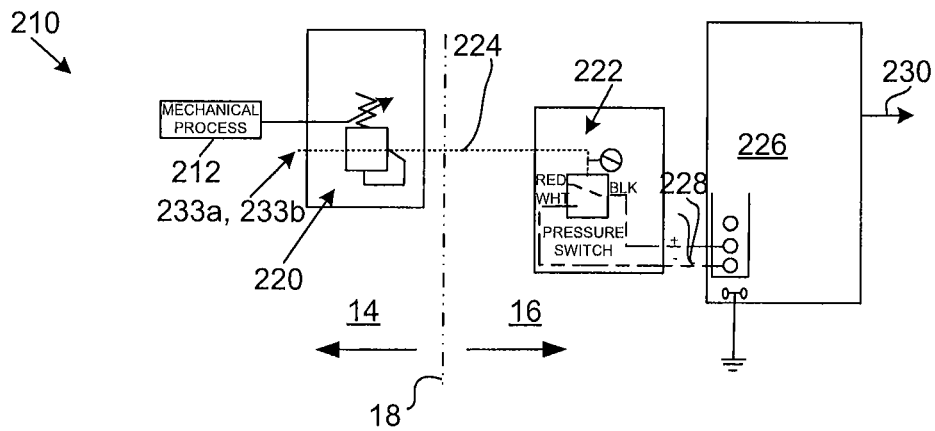
FIG. 6 is a schematic representation of another example of a system for monitoring and/or controlling equipment in a hazardous area.

Referring to FIG. 6, monitoring and/or control system 210 includes a sensor 220 that is connected to a converter 222 by a non-electrical communication link 224. The converter 222 is also connected to a controller 226 by a second communication link 228. Based on the converter output signals the controller 226 is configured to generate a controller output 230.

In this example, the sensor 220 is an adjustable pressure regulating valve in a pneumatic or hydraulic circuit 233a, 233b that is connected to a converter that is in the form of a pressure switch 222 (i.e., for example, SMC™ model GP46-P10-N01M-X30), by a suitable fluid conduit communication link 224, including, for example a hose. The fluid conduit extends across the boundary 18, from hazardous area 14 to non-hazardous area 16.

The pressure regulating valve 220 is configured to be acted upon by the equipment 212 (e.g., movement of a motor vehicle lift), which can cause the pressure regulating valve 220 to change the pressure in the fluid conduit 224. Pressure changes in the fluid conduit 224, for example, across a predetermined pressure threshold, are registered by the pressure switch 222, which in turn generates an electric output signal which is carried to the controller 226 by second communication links in the form of wires 228.

Figure 7:
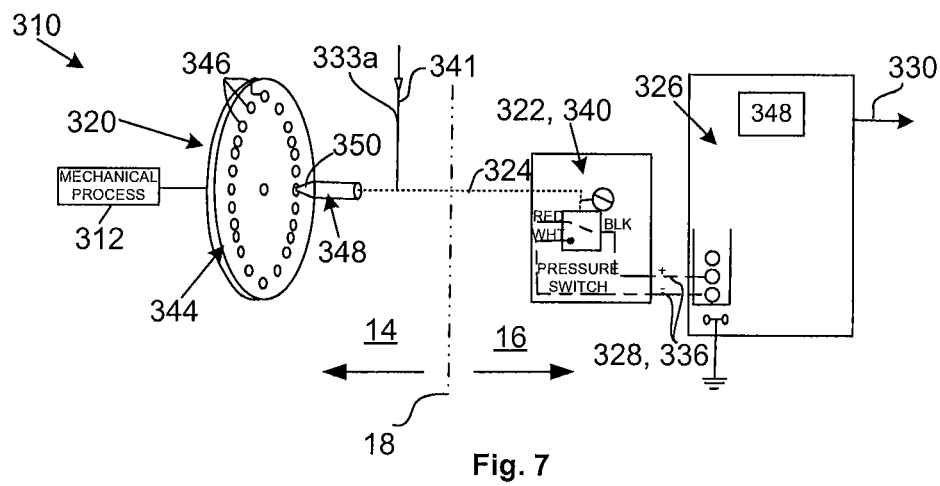
FIG. 7 is a schematic representation of another example of a system for monitoring and/or controlling equipment in a hazardous area.

Referring to FIG. 7, monitoring and/or control system 310 includes a sensor 320 that is connected to a converter 322 by a non-electrical communication link 324. The converter 322 is also connected to a controller 326 by a second communication link 328. Based on the converter output signals the controller 326 is configured to generate a controller output 330.

In this example, the sensor 320 is a pneumatic encoder in a pneumatic circuit 333a. The pneumatic encoder 320 includes a rotating disc 344 that rotates in registration with a rotating output (i.e., trigger member) of the equipment 312. The rotating disc 344 includes a plurality of recesses or apertures 346 spaced circumferentially around the disc 344. The precise number and arrangement of apertures 346 can be selected based on user requirements.

The pneumatic encoder 320 also includes a dowel 348 having a tapered portion 350 that is sized and shaped be at least partially received within the apertures 346 on the rotating disc 344. The dowel 348 reciprocates between a first position, in which the tapered portion 350 of the dowel 348 is at least partially received in an aperture 346, and a second position, in which the tapered portion 350 is free of (i.e., removed from) the apertures 346, based on the rotation of the disc 344. As the disc 344 rotates the dowel 348 can move to its first position when it is aligned with a respective one of the apertures 346 and is moved to its second position when disc 344 rotates such that the dowel 348 is not aligned with an aperture 346. This interaction between the disc 344 and the dowel 348 can translate rotational motion of the disc 344 into periodic, reciprocating motion of the dowel 348. As the disc 344 rotates the tapered portion 350 of the dowel 348 can serve as a camming or guide surface, facilitating the reciprocating motion of the dowel 348. In some examples the dowel 348 can be biased toward the disc 344 by a suitable biasing means, such as, for example a spring, an elastic, pneumatic pressure and any combination thereof. This example of a pneumatic encoder may be described as a contact encoder.

The reciprocating motion of the dowel 348 can produce a series of pressure pulses (i.e., intermittent periods of relatively high and relatively low pressure) within the pneumatic circuit 333a.

In other examples, the pneumatic encoder 320 may be a non-contact encoder. In place of the dowel 348, one example of a non-contact encoder may include a nozzle connected to the pneumatic circuit 333a that is disposed in close, but non-contacting, proximity to the rotating disc 344. The nozzle can be configured to allow fluid to escape the fluid circuit 333a.

When the disc 344 rotates such that a tip of the nozzle (i.e., the opening to allow fluid to escape the circuit 333a) is facing (i.e., opposed by) a solid portion of the disc 344 a gap is formed between the nozzle tip and the disc 344. In this configuration, fluid from the circuit 333a can escape the circuit 333a by flowing through the gap at a first flow rate. Fluid escaping at the first flow rate creates a first pressure in the circuit 333a. When the disc 344 rotates such that the tip of the nozzle is facing one of the apertures 346, fluid exiting the nozzle tip is not opposed by a solid portion of the disc 344 and can exit the nozzle at a second, faster flow rate. Fluid escaping the nozzle at the second flow rate can create a second pressure in the circuit 333a, the second pressure can be different than the first pressure. As the disc 344 rotates during use, the nozzle can be aligned with an aperture 346 and a solid portion of the disc 344 in an alternating manner, creating alternating instances of the second pressure and the first pressure, respectively, within circuit 333a. This alternating flow rate/pressure condition can produce a series of pressure pulses in the circuit 333a.

These pressure pulses (from either example described above, or any other suitable encoder operation) can act upon a suitable converter 322, in this example a pressure switch 340, which is configured to convert the pressure pulses into corresponding electrical output signals. The electrical output signals are then carried by wires 336 (examples of second communication links 328) to a controller 326.

Optionally, the controller 326 can be configured to produce an output signal 330, based on each converter output signal, which corresponds to each pressure pulse. In other examples, the controller 326 can include a counter module 348 that is configured to count the pressure pulses and produce a controller output 330 after a predetermined number of pulses are registered (for example, a controller output 330 can be produced for every 5 or 50 pressure pulses).

Figure 8:
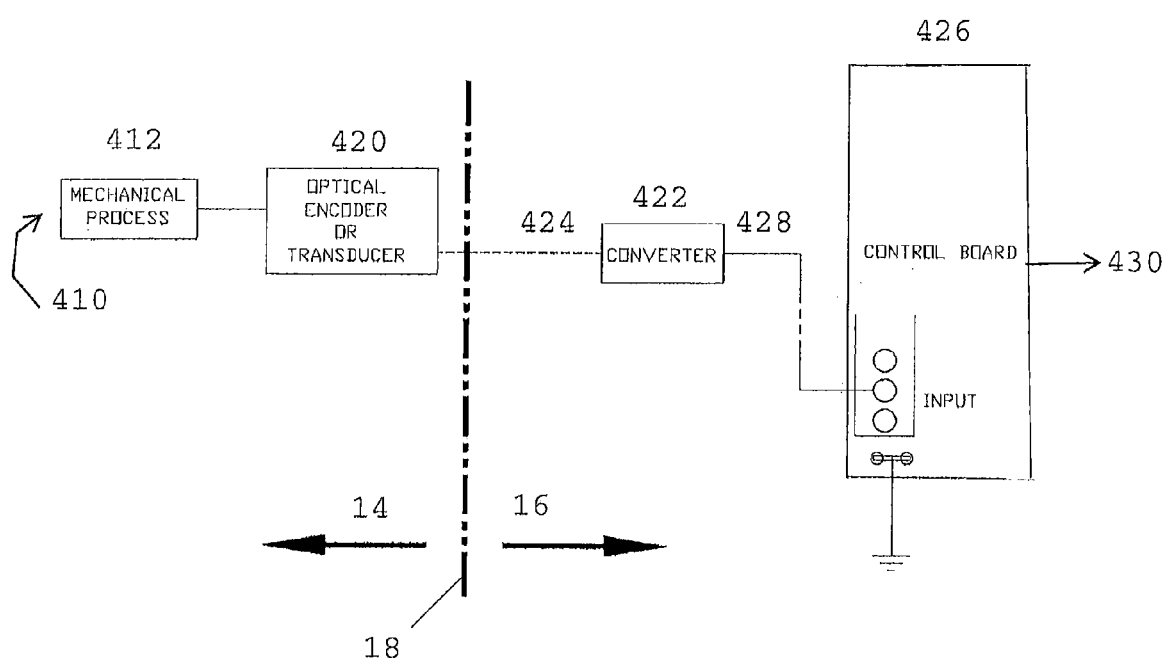
FIG. 8 is a schematic representation of another example of a system for monitoring and/or controlling equipment in a hazardous area.

Referring to FIG. 8, monitoring and/or control system 410 includes a sensor 420 that is connected to a converter 422 by a non-electrical communication link 424, such as an optical link. The converter 422 is also connected to a controller 426 by a second communication link 428, which can be electrical. Based on the converter output signals the controller 426 is configured to generate a controller output 430.

In this example, the system 410 comprises an optical circuit and the sensor 420 is an optical sensor that is activated by a mechanical process in the hazardous area. In this example, the mechanical process is measured by the sensor 420 on the equipment 412 as the equipment 412 moves. Based on the position of the equipment 412 measured by the optical sensor, an appropriate optical signal is sent along the optical communication link 424, such as, for example, fiber optics, across the boundary 18, to the converter 422 in the non-hazardous area.

In this example the converter 422 converts the optical signal into a representative or proportional electrical signal (i.e., the converter output signal). The electric converter output signals are carried by wires, acting as second communication links 428, to the controller 426. Based on the converter output signals, the controller 426 generates one or more controller outputs 430.

It can be appreciated, however, that in applicant's teachings, the converter in FIG. 8 can be incorporated into controller, similar to the example shown in FIG. 4. Such an example is shown in FIG. 9.

Figure 9:
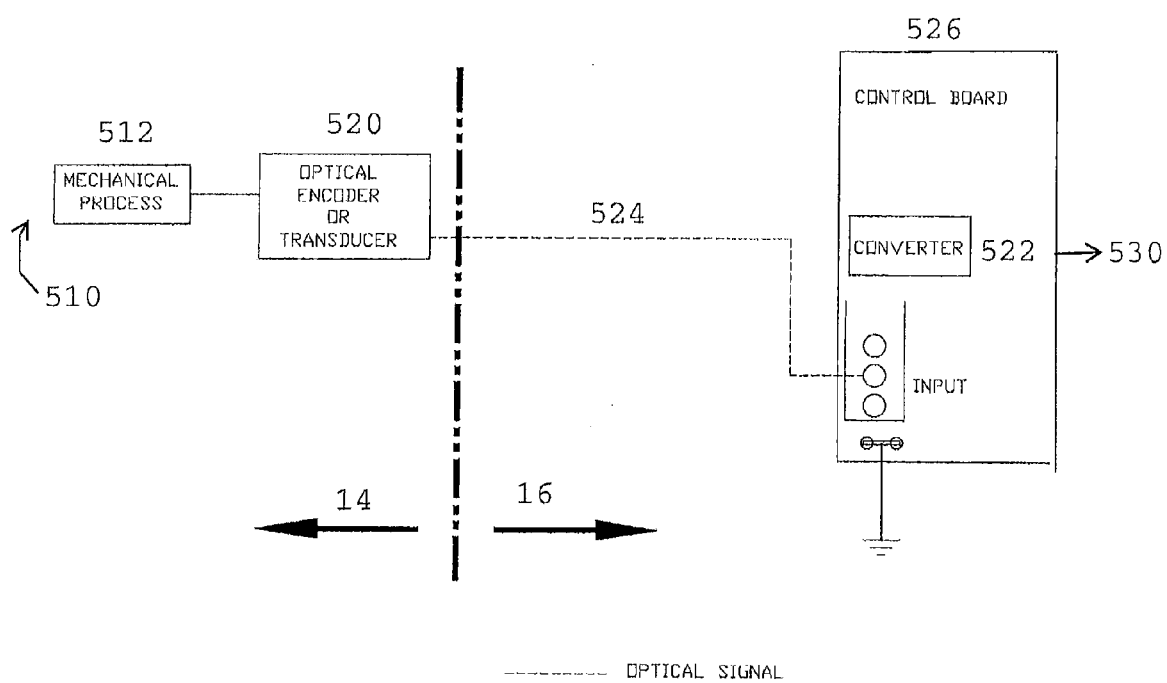
FIG. 9 is a schematic representation of another example of a system for monitoring and/or controlling equipment in a hazardous area.

Referring to FIG. 9, monitoring and/or control system 510 includes a sensor 520 that is connected by a non-electrical communication link 524, such as an optical link directly to the controller 526. The controller 526 includes converter 522 to convert the received optical signal to the appropriate signal for use by the controller 526, for example, an electrical signal. Based on the received signals the controller 526 generates a controller output 530.

In this example, the system 510 comprises an optical circuit and the sensor 520 is an optical sensor that is activated by a mechanical process in the hazardous area. In this example, the mechanical process is measured by the sensor 520 on the equipment 512 as the equipment 512 moves. Based on the position of the equipment 512 measured by the optical sensor, an appropriate optical signal is sent along the optical communication link 524, such as, for example, fiber optics, across the boundary 18, to the controller 526 in the non-hazardous area.

In this example the controller 526 converts the optical signal into a representative or proportional electrical signal (i.e., the converter output signal) internally, such as with an internal converter 522. Based on the converter output signals, the controller 526 generates one or more controller outputs 530.

It can be appreciated that although specific examples are shown, it is applicants' intent that various combinations and arrangements of the examples shown in FIGS. 1 to 9 can be made as will be appreciated to those of skill in the art. For example, but not limited to, having the converter separate from the controller, or within the controller, or mixing various combinations of types of communication links as appropriate.

Figure 10:
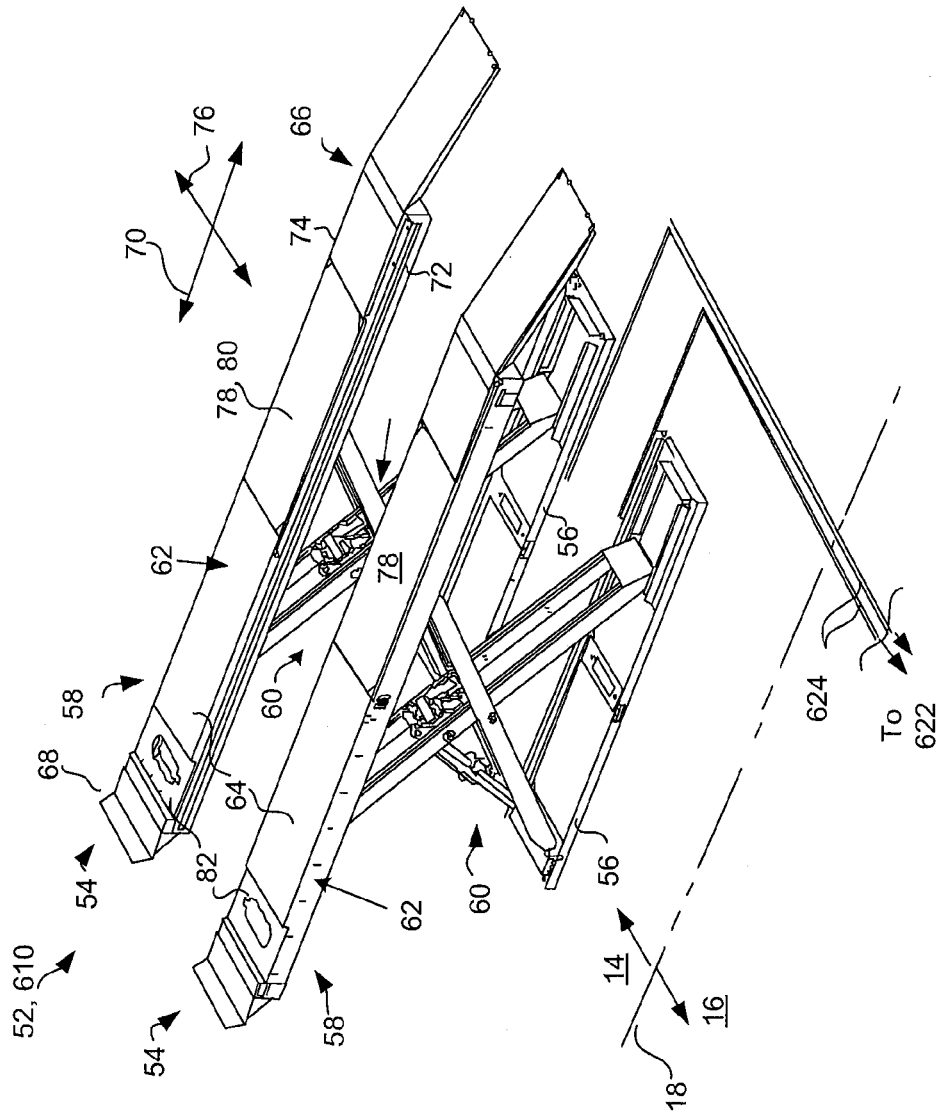
FIG. 10 is an isometric view of a vehicle lift system incorporating a monitoring and/or control system.

One example of a type of equipment 12 (or 112, 212, 312, 412, 512—hereinafter generally denoted as 12) that can be monitored and/or controlled using the monitoring and/or control systems described above is a motor vehicle lift systems. Motor vehicle lift systems can be used to lift a motor vehicle to a predetermined distance or height above the ground to allow a mechanic or technician to access the underside of a vehicle for inspection or repair. Examples of vehicle lift systems include, two-post lift systems (FIG. 15), four-post lift systems (FIG. 14) and scissor lift systems (FIG. 10). In operation, motor vehicle lift systems can be moveable between a first or lowered position, in which a motor vehicle can be driven or moved onto the lift system, and a second or raised position, in which the motor vehicle is raised to a desired working height.

Referring to FIG. 10, an example of a motor vehicle lift system 52 incorporating a monitoring and/or control system 610. In this example the vehicle lift system 52 comprises a pair of spaced apart scissor lifts 54 installed within a hazardous area 14, such as, for example an automotive garage. Each scissor lift system 54 includes a base 56, a wheel runway apparatus 58 and a lift mechanism 60. As used herein, the term "wheel" or "vehicle wheel" refers to the tire and wheel assembly found on a motor vehicle. Such an assembly generally includes a conventional tire that is mounted on a metal wheel or "rim."

In the illustrated example, the scissor lifts 54 are free to move independently as they are not mechanically linked together. When in use, the scissor lifts 54 can be operated in unison (i.e., raised and lowered at substantially the same time and the same rate) so that a vehicle supported on the lift maintains a substantially level configuration at all times, for example when being raised, when being held at a fixed height, when being lowered and when the vehicle lift system 52 is in its lowered position (when a vehicle can be loaded or unloaded off the lift). In the present example, the scissor lifts 54 are the same, and any description of one scissor lift 54 is understood to be applicable to both scissors lifts 54. In other examples, the scissor lifts 54 can be different.

Optionally, the wheel runway apparatus 58 can include a support structure 62. The support structure 62 includes a top surface 64 for supporting wheels of a vehicle. The support structure 62 includes first and second ends 66, 68, and a length extending between the first and second ends 66, 68 defining a longitudinal direction 70. The support structure 62 further includes inner and outer sides 72, 74, and a width extending between the inner and outer sides 72, 74 defining a lateral direction 76.

The wheel runway apparatus 58 can include a first support plate 78 movably mounted on the support structure 62. The first support plate 78 can be located towards the first end 66 of the support structure 62 and can be referred to as a "slip plate." The first movable support surface 78 can be a generally rectangular plate mounted on a bearing surface (not shown). The first support plate 78 has topside 80 defining a surface for supporting fixed or rear wheels of a vehicle. The first support plate 78 can be generally rectangular, and the topside 80 can be generally flush with the top surface 64 of the support structure 62. The first support plate 78 can permit limited motion of the fixed wheels of the vehicle in a horizontal plane, at least in the lateral direction 76, relative to the support structure 62.

The wheel runway apparatus 58 can also include a second support plate (not shown) movably mounted on the support structure 62. The second support plate can be located towards the second end 68 of the support structure 62, received on bearing surface 82 and can be referred to as a "turn plate" or a "turntable." The second support plate can be a generally round plate mounted on a bearing surface generally flush with the top surface 64 of the support structure 62. The second support plate can permit the steered or front wheels of a vehicle to be steered from side to side without requiring lifting of the vehicle, and simultaneously permit rotational motion and limited motion in a horizontal plane, in the longitudinal and lateral directions, 70, 76, relative to the support structure 62. The second support plate can have a topside defining a surface for supporting steered or front wheels of a vehicle.

Optionally, the wheel runway apparatus 58 can include at least one lighting module (not shown). The lighting module can be mounted to the top surface 64 of the support structure 62. The lighting module can be mounted generally flush relative to the top surface 64 of the support structure 62. The lighting module can extend adjacent the inner side 72 of the support structure 62. The lighting module can be configured to illuminate an underside region of the vehicle when the vehicle is parked on the wheel runway apparatus 58. The lighting module can be configured to provide illumination directed generally upwards towards parts of the vehicle that require servicing, and generally not in the mechanic's eyes. In a vehicle wheel alignment lift system, the lighting module can be disposed adjacent the movable support surface of the wheel runway apparatus 58 to provide illumination during wheel alignment procedures.

Figure 13:
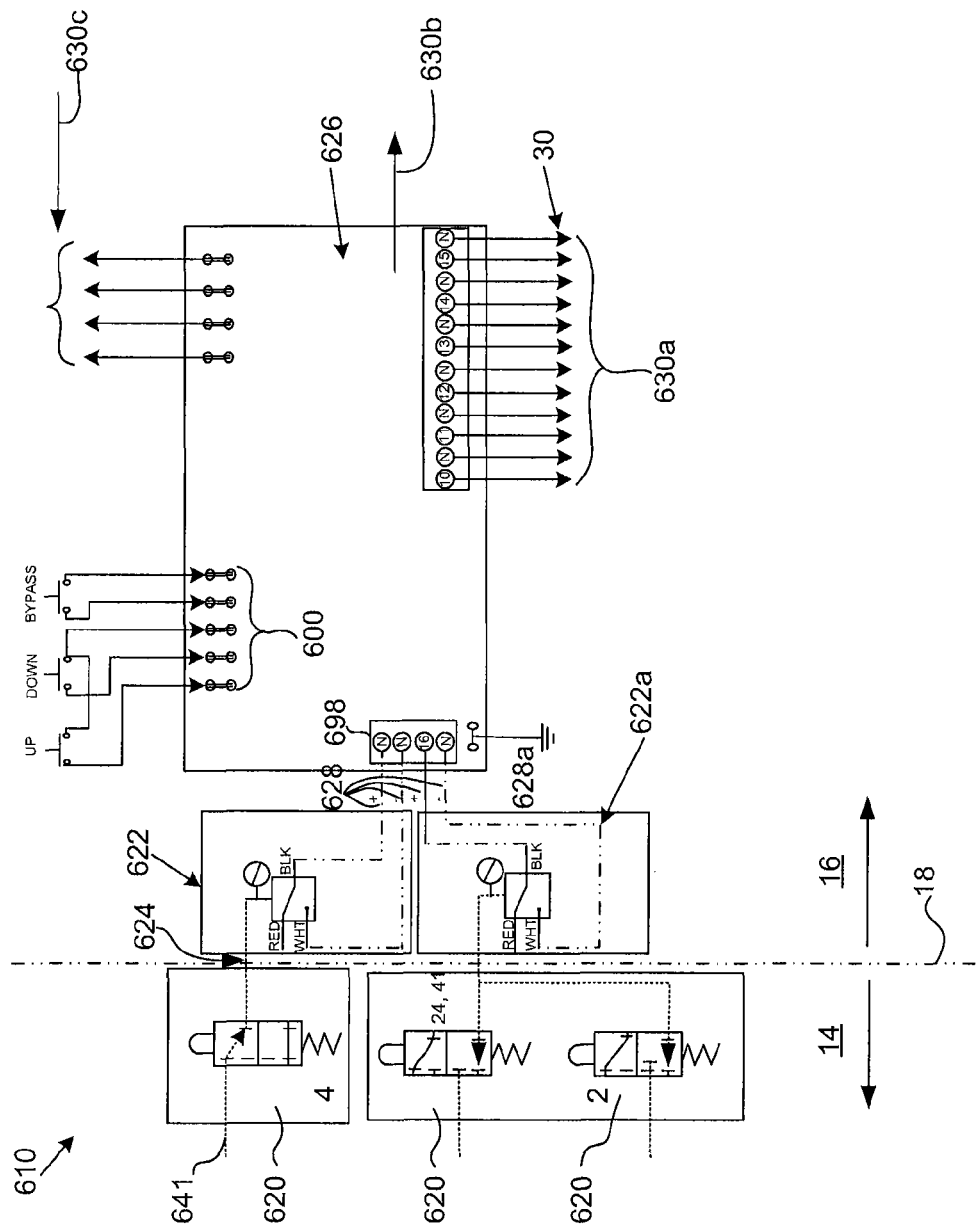
FIG. 13 is a schematic representation including a monitoring and/or control system that can be used with the vehicle lift of FIGS. 10-12.

In some examples, the lighting module includes an assembly or plurality of light emitting diodes. The light emitting diodes can be high intensity and low voltage. The light emitting diodes can provide lighting of the work area and can increase reliability of lighting. Furthermore, use of an assembly or plurality of light emitting diodes can reduce or substantially eliminate shadow effects in the work area. Optionally, the lighting module, or other accessories used in combination with the lift system 52, can be controlled by the controller output signals 630 generated by the system controller 626 (FIG. 13).

The base 56 of each scissor lift 54 can be any suitable structure, such as the metal frame illustrated, that can be used to adequately secure the lift mechanism 60 to a solid, underlying surface, such as the floor of an automotive garage. The base 56 can be made of any suitable material that can handle the loading and mechanical stresses exerted by the lift mechanism 60, including, for example, metal, plastic and composite materials. The base material can also be selected to have desired chemical properties so that the base can withstand exposure to substances expected to be present in an automotive garage, such as, for example, oil, paint, gasoline, solvents and automotive battery acid. Optionally, the base 56 can mounted upon the floor, recessed beneath the floor surface or be an integral feature in the floor.

Figure 11:
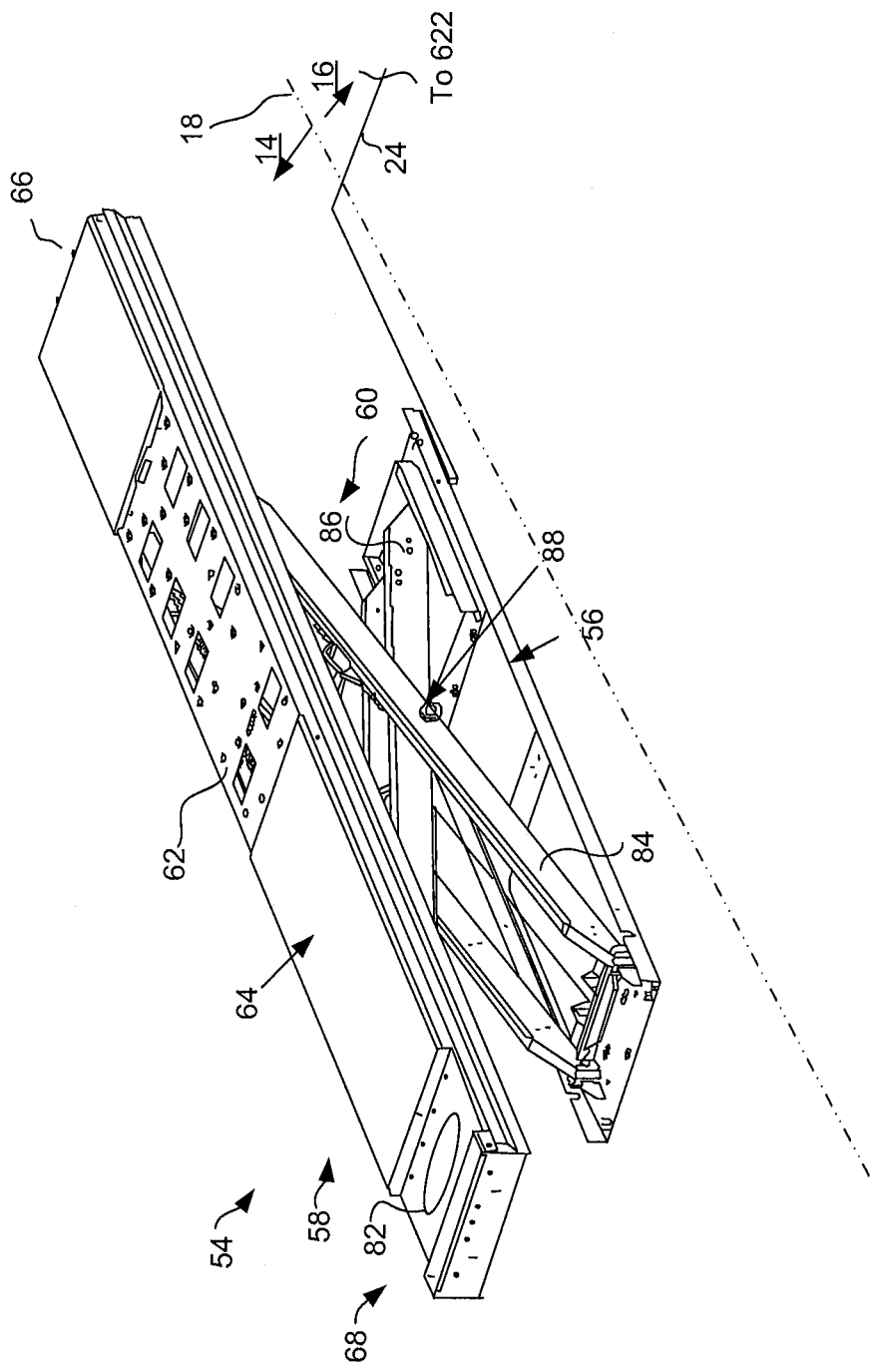
FIG. 11 is an isometric view of a single scissor lift from the vehicle lift system of FIG. 10.
Figure 12:
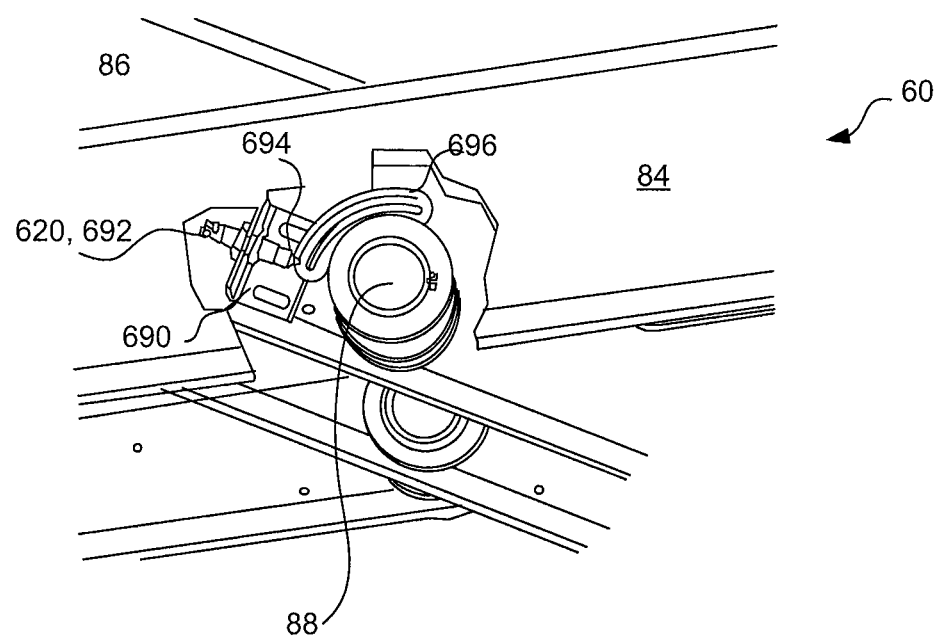
FIG. 12 is a partial cut-away view of the scissor lift of FIG. 11.

Referring to FIGS. 11 and 12, the illustrated example of a scissor lift 54 includes a lift mechanism 60 that comprises first and second scissor members 84, 86 that are pivotally connected using pin joint 88. As the scissor lift 54 moves between lowered and raised positions the first and second scissor member 84, 86 rotate relative to each other about pin joint 88. A sensor 620 is mounted to the second scissor member 86 in a predetermined position using mounting bracket 690. In this example the sensor 620 is a pneumatic limit switch 692 (for example, FESTO™ model no. 12146) connected to a pneumatic circuit (not shown). Alternatively, the sensor 620 can be any other suitable sensor as described above.

In the illustrated example the pneumatic limit switch 692 includes a cam follower portion 694 that follows the profile of a cam 696 (i.e., trigger member) that is mounted to the first scissor member 84. As the lift mechanism 60 is raised and/or lowered the first scissor member 84 rotates relative to the second scissor member 86, which moves the surface of the cam 696 relative to the cam follower portion 694 of the limit switch 692. The profile of the cam surface can be selected to engage/disengage the limit switch 692 when the lift mechanism 60 moves past predetermined threshold positions. Examples of such positions include the lowered position (when the scissor lift 54 in the vehicle loading position), a maximum height position, a desired working height position and an accessory (e.g., lighting module) threshold position.

In the present example, the sensor outputs generated by the pressure limit switch 692 include an "on" pneumatic flow and an "off" pneumatic flow (i.e., an absence of flow passing through the limit switch 692). The output flows from the limit switch 692 are carried in pneumatic conduits 624 from the vehicle lift 52 in the hazardous area 14, across the boundary 18, to a corresponding converter 622 in the non-hazardous area 16 (FIG. 13). In this example, as shown in FIG. 13, the converter 622 is a pressure switch, but any suitable converter can be used.

Optionally, the cam profile can be set so that the outputs from limit switch 692 shown in FIG. 12 are indicative of the lift mechanism 60 being at a predetermined working height. The outputs from the limit switch 692 are converted by pressure switch 622 into electrical signals that are sent to a controller 626 by electrical communication links in the form of wires 628. Based on the converter output signals the controller 626 can activate one or more appropriate lift accessories using controller outputs, such as controller outputs 630b. For example, the controller 626 can be used to turn on the lighting module when the lift mechanism 60 is at working height and turn off the lighting module when the lift mechanism 60 is below the working height.

In other examples, signals from sensors 620 on the vehicle lift 52 can be used to automatically lock the slip plates and/or turning plates in predetermined positions when the scissor lifts 54 are moved to a predetermined location (such as the lowered position).

In another example, both scissor lifts 54 can include additional limit switches 620a (represented in FIG. 13). In this example the cam profiles in each lift mechanism 60 can be set so that the outputs from limit switch 620a are indicative of the lift mechanism 60 being in the lowered position (i.e., completely seated on its respective base 56). The sensor outputs from both limit switches 620a can be routed to a single pressure switch converter 622a, as shown in FIG. 13. In this configuration, the monitoring and/or control system 610 can be used to control the vehicle lift system 52 equalization.

In this example, when the lift mechanisms 60 of each scissor lift 54 are moved toward the their lowered positions the pressure switch 622a can receive a sensor output when each limit switch 620a is activated (when each lift mechanism 60 is seated on its base). The sensor outputs are converted to electrical signals for the controller 626 by the pressure switch 622a. The controller 626 can be configured to recognize or determine when only one limit switch 620a is triggered (for example by the magnitude of the converter output signal) and continue lowering the other lift mechanism 60 until both sides of the vehicle lift system 52 are seated on their bases. Alternatively, or in addition, the pressure switch 622a can be configured such that it will only output an electrical signal to the controller 626 when both limit switches 620a connected to the pressure switch 622a are activated. For example, the pressure required to activate the pressure switch 622a can be greater than the pressure output signal produced by one of the limit switches 620a, but less than the combined pressure output signals of both limit switches 620a.

Using the system 610 in this manner enables the controller 626 to ensure that vehicle lift system 52 is equalized or leveled each time the lift mechanisms 60 are lowered onto the bases. In such a system, the likelihood of lift mechanism 60 positioning errors accumulating over multiple vehicle lift 52 strokes or cycles can be reduced because the positions of the scissor lifts 54 are "equalized" each time the vehicle lift 52 is lowered. A converter 622a used in such a system can be referred to as an equalization converter and can produce equalization converter output signals.

Optionally, the vehicle lift system 52 can include an additional sensor 20, for example another limit switch, positioned on the vehicle lift 52 such that the limit switch is triggered when one of the scissor lifts 54 reaches a predetermined maximum height. When this upper limit switch is triggered the sensor output is converted using a corresponding pressure switch converter and the resulting electrical signal can cause the controller 626 to stop the upward movement of one or both of the scissor lifts 54.

Alternatively, or in addition, one or more limit switch can be mounted to the base 56 or floor of the garage so that the limit switch is contacted by at least one of the scissor members 84, 86 or the wheel runway supports 58 when the scissor lift 54 reaches its lowered position. In such a configuration, the structural components of the scissor lift 54 (scissor members 84, 86 and wheel runway supports 58) can act as the trigger member for engaging the limit switch.

Referring to FIG. 13, an example of a controller 626 that can be used in combination with a vehicle lift system 52 includes inputs 698 for receiving the converter output signals from one or more converters 622, 622a. The controller 626 also includes inputs 600 for receiving operator commands, such as, for example, up, down and bypass commands from a set of operator controls.

The controller 626 also includes a plurality of outputs for controlling a variety of functions such as, for example, outputs 630a for controlling the hydraulic pumps and motors used to raise and lower the vehicle lift system 52 and outputs 630c for controlling hydraulic flow control solenoids to adjust the lift mechanism position.

Optionally, all of the sensors 620, 620a monitoring the vehicle lift 52 can be pneumatic sensors. In such a system, a lack of pneumatic pressure can result in the vehicle lift 52 sensors 620, 620a being inoperable. Optionally, the system 610 can be configured so that the "off" or inactive position of the sensors 620, 620a (such as limit switches) is the open position such that the corresponding converters 622, 622a are exposed to high pressure (i.e., the selected operating pressure of the pneumatic circuit used in the system 610). The controller 626 can be configured so that the vehicle lift 52 can only be operated when system pressure is detected by one or more predetermined converters 622, 622a. Using such a controller 626, a loss of system pressure (by leakage or component failure) can cause the controller 626 to shut-down or otherwise immobilize the vehicle lift 52, which can prevent an operator from moving the vehicle lift 52 when the position monitoring sensors 620, 620a are inoperable. This may be a desirable safety feature.

Figure 14:
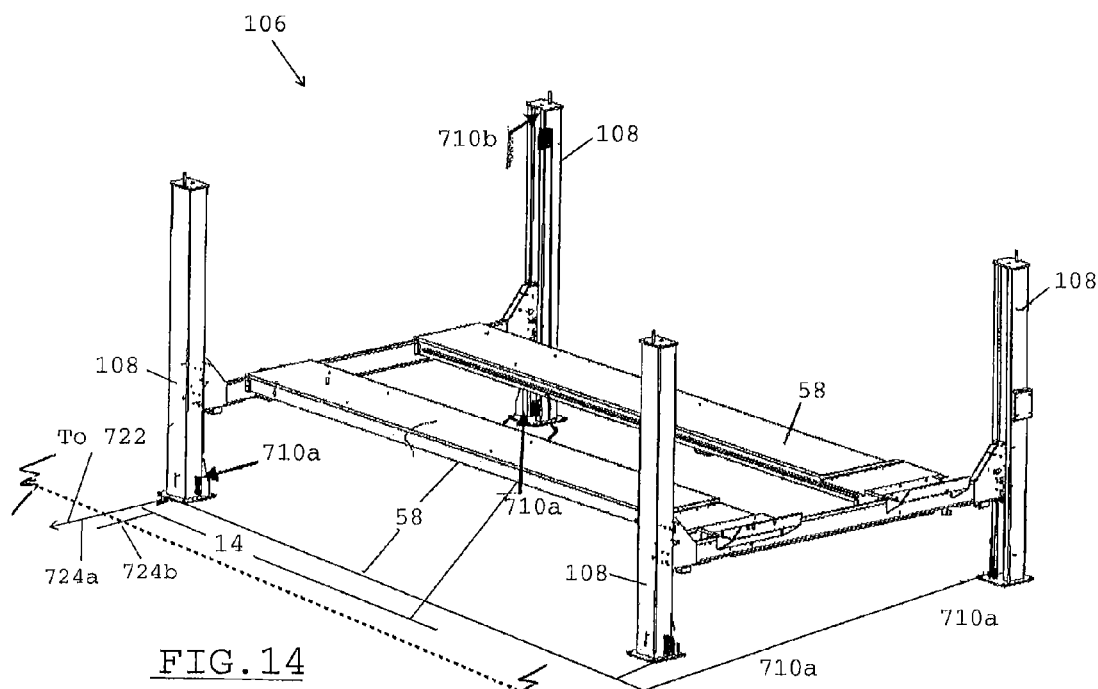
FIG. 14 is an isometric view of another example of a vehicle lift incorporating an example of a monitoring and/or control system.
Figure 15:
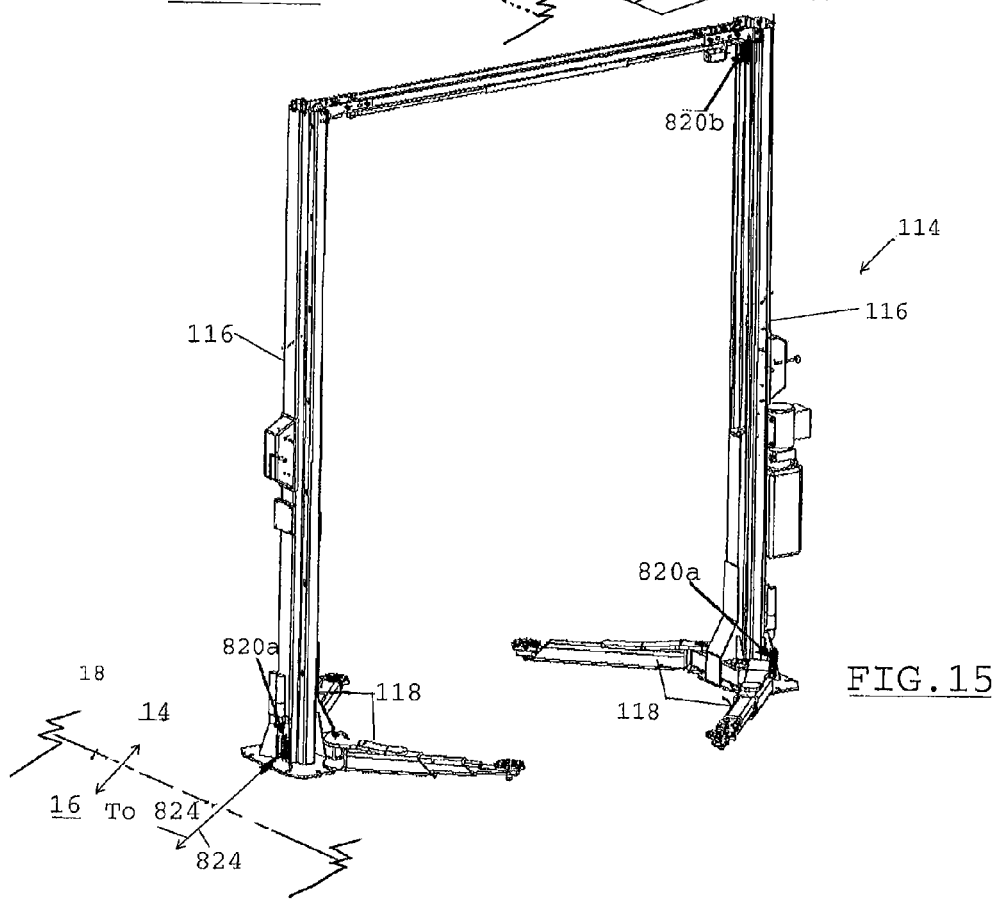
FIG. 15 is an isometric view of another example of a vehicle lift incorporating an example of a monitoring and/or control system.

Referring to FIG. 14, an example of a four-post vehicle lift 106 includes four upright posts 108 that cooperate to support a pair of wheel runway supports 58. The wheel runway supports 58 can be the same as the wheel runway supports 58 described above, or can be any other suitable type of wheel supporting structure. The four-post vehicle lift 106 can be monitored and controlled using a control system of applicants' teachings.

In this example, lower limit sensors 720a can be installed at suitable locations, such as toward the bottom of each post 108, on one or more of the posts 108 such that the lower limit sensors are triggered when the wheel runway supports 58 are in their lowered positions (i.e. in a vehicle loading/unloading position). The lower limit sensors 720a can be any type of sensor described above, including pressure limit switches 92.

The lower limit sensors 720a can be pneumatically connected to a suitable converter 722 using pneumatic hoses 724, which can in turn be connected to a controller that controls the movement of the wheel runway supports 58.

Similarly, the four-post vehicle lift 106 can include an upper limit sensor 720b (such as a limit switch) positioned toward the top of one or more of the posts 108. The pneumatic flow form the upper limit sensor 720b can transported by hose 724b and can be converted by a suitable converter and can cause a controller to stop the upward movement of the wheel runway supports 58 when the upper limit sensor 720b is triggered. Optionally, hoses 724a,b can be combined into a single hose or conduit that is connected to multiple sensors.

The signals from both the upper and lower limit sensors 720a, 720b can be carried to their respective converters via communication links 724a, 724b (pneumatic conduits in this example) from the hazardous area 14, across the boundary 18 and into the non-hazardous area 16.

Referring to FIG. 13, an example of a two-post lift 114 includes two generally upright posts 116, each of which movably supports a pair of vehicle lifting arms 118 configured to contact the frame of a vehicle being lifted on the two-post lift 114. The two-post lift 114 also includes lower and upper limit sensors 820a, 820b (for example limit switches 92 described above).

The lower limit sensors 820a are positioned toward the bottom of each post 116 such that the lower limit sensors 820a are tripped when the vehicle lifting arms 118 reach their lowered (vehicle loading) positions. The two-post lift 114 can include a controller, like the controller 626 illustrated in FIG. 11, that is configured to use the inputs from the lower limit sensors 820a (converted by suitable converters 822) to equalize the positions of the vehicle lifting arms 118 after each lift.

Similarly, the upper limit sensor 820b is positioned such that it is triggered when the vehicle lifting arms 118 reach a predetermined maximum height, which causes the controller to stop the upward movement of the vehicle lifting arms 118.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A system for monitoring or controlling equipment in a hazardous area, the system comprising:
at least one sensor disposed within a hazardous area, each sensor being non-electrical and being adapted to interact with the equipment and generate at least a first non-electric sensor output and a second non-electric second sensor output, the first sensor output being indicative of a first equipment state and the second sensor output being indicative of a second equipment state;
a non-electrical communication link extending from the at least one sensor across a boundary between the hazardous area and a non-hazardous area, the non-electric communication link to carry the sensor outputs from the at least one sensor;
at least one controller disposed in the non-hazardous area, the at least one controller coupled to the communication link and operable to generate a controller output signal based on the sensor outputs; and
a lift comprising first and second scissor lifts, a respective valve connected to each scissor lift, the respective valves on each scissor lift being pneumatically linked to at least one converter, the converter being adapted to provide an equalization converter output signal to the controller, the controller being adapted to equalize the positions of the first and second scissor lifts in response to the equalization converter output signal.

2. The system of claim 1, wherein the at least one converter communicably links the at least one sensor and the controller, the at least one converter connected to the communication link to receive the sensor outputs and convert it to a form useable by the at least one controller.

3. The system of claim 2, wherein the at least one converter is part of the at least one controller and converts the sensor outputs within the controller.

4. The system of claim 2, wherein the at least one converter is disposed in the non-hazardous area between the at least one sensor and the at least one controller.

5. The system of claim 2, wherein the at least one converter converts the non-electric sensor outputs to electrical signals.

6. The system of claim 1, wherein the controller is adapted to control the state of equipment based on the converter output signal.

7. The system of claim 1, wherein the sensor outputs comprise optical signals.

8. The system of claim 1, wherein the sensor outputs comprise output fluid flows.

9. The system of claim 8, further comprising a fluid circuit configured to receive a working fluid, each sensor comprising at least one regulator in the circuit, the at least one regulator disposed within the hazardous area and being operatively connected to the equipment, each regulator configured to receive an incoming fluid flow, the first and second sensor outputs comprising, respectively, the first and second output fluid flows downstream of the at least one regulator.

10. The system of claim 9, wherein each converter comprises a pressure switch in communication with the fluid circuit downstream from respective ones of the at least one regulators.

11. The system of claim 9, wherein each regulator comprises a valve, each valve configurable between open and closed configurations, the first output fluid flow being generated when the valve is in the open configuration, the second output fluid flow being generated when the valve is in the closed configuration.

12. The system of claim 1, further comprising at least one trigger member mounted on the equipment, each trigger member corresponding to and adapted to engage at least one valve, each trigger member and corresponding valve connected to the equipment so that changing the equipment from the first equipment state to the second equipment state causes the trigger member to change the configuration of at least one corresponding valve.

13. The system of claim 12, wherein each trigger member comprises a cam and each valve comprises a complimentary cam follower configured to engage the at least one cam.

14. A lift system for operation in a hazardous area, the lift system comprising:
   a) a lift mechanism, the lift mechanism being movable between first and second positions;
   b) at least one sensor connected to the lift, the at least one sensor being non-electric and being configured to generate at least a first non-electric sensor output and second non-electric sensor output, the first sensor output being indicative of the lift mechanism being in the first position and the second sensor output being indicative of the lift mechanism being in the second position;
   c) a controller disposed outside the hazardous area, the controller in communication with the at least one sensor, and the controller being adapted to control the movement of the equipment based on the sensor outputs; and
   d) first and second scissor lifts and a respective valve connected to each scissor lift, the respective valves on each scissor lift being pneumatically linked to an equalization converter, the equalization converter being adapted to provide an equalization converter output signal to the controller, the controller being adapted to equalize the positions of the first and second scissor lifts in response to the equalization converter output signal.

15. The lift of claim 14, wherein the at least one sensor comprises at least a first sensor and a second sensor, the first sensor interacting with the lift so that the first sensor is triggered when the lift mechanism is in the first position, the second sensor interacting with the lift so that the second sensor is triggered when the lift mechanism is in the second position.

16. A method of monitoring and/or controlling equipment in a hazardous area, the method comprising the steps of:
   e) sensing an equipment state using at least one sensor within the hazardous area, the at least one sensor being non-electric and being adapted to interact with the equipment:
   f) generating at least a first non-electric sensor output and a second non-electric sensor output, the first sensor output being indicative of a first equipment state and a second sensor output being indicative of a second equipment state;
   g) transmitting to a controller the non-electric sensor outputs across a boundary between the hazardous area and a non-hazardous area;
   h) generating a controller output signal based on the sensor outputs; and
   i) monitoring and/or controlling the equipment based on the controller output signal,
   wherein the equipment state is at least first and second positions in a lift mechanism, the lift comprising first and second scissor lifts, a respective valve connected to each scissor lift, the respective valves on each scissor lift being pneumatically linked to at least one converter, the converter being adapted to provide an equalization converter output signal to the controller, the controller being adapted to equalize the positions of the first and second scissor lifts in response to the equalization converter output signal.

17. The method of claim 16, further comprising converting in the non-hazardous area the non-electric sensor outputs to at least one corresponding signal for use by the controller.

18. The method of claim 16, wherein the step of converting takes place within the controller.

19. The method of claim 16, wherein the step of converting takes place in the non-hazardous area and separate from the controller.

20. The method of claim 16, wherein the at least one converter converts the non-electric sensor outputs to electrical signals.

21. The method of claim 16, wherein the non-electric sensor outputs comprise optical signals.

22. The method of claim 16, wherein the non-electric sensor outputs comprise output fluid flows.

23. The lift of claim 14, wherein the converter communicably links the at least one sensor and the controller, the converter to receive the sensor outputs and convert it to a form useable by the controller.

24. The lift of claim 23, wherein the converter is part of the controller and converts the sensor outputs within the controller.

25. The lift of claim 24, wherein the converter is disposed in the non-hazardous area between the at least one sensor and the controller.

26. The lift of claim 24, wherein the converter converts the non-electric sensor outputs to electrical signals.

27. The lift of claim 14, wherein the controller is adapted to control the state of equipment based on the converter output signal.

28. The lift of claim 14, wherein the sensor outputs comprise optical signals.

29. The lift of claim 14, wherein the sensor outputs comprise output fluid flows.

30. The lift of claim 29, further comprising a fluid circuit configured to receive a working fluid, each sensor comprising at least one regulator in the circuit, the at least one regulator disposed within the hazardous area and being operatively connected to the lift, each regulator configured to receive an incoming fluid flow, the first and second sensor outputs comprising, respectively, the first and second output fluid flows downstream of the at least one regulator.

31. The lift of claim 30, wherein each converter comprises a pressure switch in communication with the fluid circuit downstream from respective ones of the at least one regulators.

32. The lift of claim 30, wherein each regulator comprises a valve, each valve configurable between open and closed configurations, the first output fluid flow being generated when the valve is in the open configuration, the second output fluid flow being generated when the valve is in the closed configuration.

33. The lift of claim 14, further comprising at least one trigger member mounted on the lift, each trigger member corresponding to and adapted to engage at least one valve, each trigger member and corresponding valve connected to the lift so that changing the lift from the first position to the second position causes the trigger member to change the configuration of at least one corresponding valve.

34. The lift of claim 33, wherein each trigger member comprises a cam and each valve comprises a complimentary cam follower configured to engage the at least one cam.

35. The lift of claim 34, wherein the first and second scissor lifts are pivotally connected the valve being mounted on one of the first and second scissor members and the cam mounted on the other of the first and second scissor members.

* * * * *